United States Patent
Kuroda et al.

(10) Patent No.: US 10,647,937 B2
(45) Date of Patent: May 12, 2020

(54) MINERAL BASE OIL AND LUBRICATING OIL COMPOSITION

(71) Applicant: IDEMITSU KOSAN CO., LTD., Chiyoda-ku (JP)

(72) Inventors: Norihiro Kuroda, Chiba (JP); Hisao Anzai, Kisarazu (JP); Kenji Goto, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/078,415

(22) PCT Filed: Feb. 3, 2017

(86) PCT No.: PCT/JP2017/004089
§ 371 (c)(1),
(2) Date: Aug. 21, 2018

(87) PCT Pub. No.: WO2017/145714
PCT Pub. Date: Aug. 31, 2017

(65) Prior Publication Data
US 2019/0024004 A1    Jan. 24, 2019

(30) Foreign Application Priority Data

Feb. 25, 2016 (JP) .................. 2016-034165

(51) Int. Cl.
*C10M 101/02* (2006.01)
*C10M 177/00* (2006.01)

(52) U.S. Cl.
CPC ........ *C10M 101/02* (2013.01); *C10M 177/00* (2013.01); *C10M 2203/1006* (2013.01); *C10N 2220/02* (2013.01); *C10N 2220/022* (2013.01); *C10N 2220/025* (2013.01); *C10N 2220/026* (2013.01); *C10N 2220/027* (2013.01); *C10N 2220/031* (2013.01); *C10N 2230/02* (2013.01); *C10N 2240/02* (2013.01); *C10N 2240/04* (2013.01); *C10N 2240/042* (2013.01); *C10N 2240/044* (2013.01); *C10N 2240/045* (2013.01); *C10N 2240/08* (2013.01); *C10N 2240/10* (2013.01); *C10N 2240/12* (2013.01); *C10N 2240/14* (2013.01); *C10N 2240/30* (2013.01); *C10N 2240/401* (2013.01); *Y02T 10/6295* (2013.01)

(58) Field of Classification Search
CPC combination set(s) only.
See application file for complete search history.

(56) References Cited

U.S. PATENT DOCUMENTS

| 8,703,663 B2 * | 4/2014 | Tagawa .................. C10G 45/58 208/19 |
| 2011/0049008 A1 | 3/2011 | Tagawa et al. |
| 2014/0113848 A1 | 4/2014 | Miyamoto et al. |
| 2015/0060327 A1 | 3/2015 | Tagawa et al. |
| 2016/0042830 A1 * | 2/2016 | Ohno .................. C10M 101/02 252/570 |
| 2016/0053196 A1 * | 2/2016 | Tagawa .............. C10M 169/041 508/463 |

FOREIGN PATENT DOCUMENTS

| EP | 2 706 106 A1 | 3/2014 |
| JP | 2004-182931 A | 7/2004 |
| JP | 2013-53320 A1 | 3/2013 |
| WO | WO 2009/119505 A1 | 10/2009 |
| WO | WO 2013/147305 A1 | 10/2013 |
| WO | WO 2014/157217 A1 | 10/2014 |

OTHER PUBLICATIONS

International Search Report dated Feb. 28, 2017, in PCT/JP2017/004089 filed Feb. 3, 2017.
International Search Report dated Feb. 28, 2017 in PCT/JP2017/004089.
Extended European Search Report dated Sep. 26, 2019 in Patent Application No. 17756156.0, 7 pages.

* cited by examiner

*Primary Examiner* — Ellen M McAvoy
*Assistant Examiner* — Chantel L Graham
(74) *Attorney, Agent, or Firm* — Oblon, McClelland, Maier & Neustadt, L.L.P.

(57) ABSTRACT

Provided is a mineral base oil having a kinematic viscosity at 40° C. of 4.0 mm$^2$/s or more and less than 6.0 mm$^2$/s, a kinematic viscosity at 100° C. of 1.0 mm$^2$/s or more and less than 2.0 mm$^2$/s, and a flash point of 140° C. or higher. A lubricating oil composition containing the mineral base oil has a high flash point while having a low viscosity and thus having excellent fuel-saving performance when used as a driving system oil and the like.

16 Claims, No Drawings

MINERAL BASE OIL AND LUBRICATING OIL COMPOSITION

FIELD OF INVENTION

The present invention relates to a mineral base oil, a lubricating oil composition using the mineral base oil, and a method of using a lubricating oil composition.

BACKGROUND ART

In recent years, lubricating oil compositions used as driving system oils, such as automatic transmission fluids (ATF), continuously variable transmission fluids (CVTF), and shock absorber fluids (SAF), engine oils, hydraulic fluids, and the like have been required to have various characteristics according to various applications.

Since characteristics of a lubricating oil composition often largely depend on the nature of a base oil used therein, development of such a base oil that can produce a lubricating oil composition capable of exhibiting required characteristics has been actively promoted.

For example, PTL 1 discloses a hydrocarbon lubricant base oil having a flash point of 170° C. or higher, a kinematic viscosity at 40° C. of 9.0 to 14.0 mm$^2$/s, a viscosity index of 100 or more, a 6 volume percent distillation temperature in a distillation test of 310° C. or higher, a pour point of −30° C. or lower, and an aromatic content (% $C_A$) of 0.1 or less.

According to the disclosure of PTL 1, the lubricant base oil is suitable for lubricating oil compositions used at high temperature, such as power steering fluids and transmission fluids for automobiles, since the lubricant base oil has a high flash point while maintaining a viscosity a conventional lubricant base oil has.

CITATION LIST

Patent Literature

PTL 1: JP 2004-182931 A

SUMMARY OF INVENTION

Technical Problem

Meanwhile, lubricating oil compositions used as driving system oils are being required in late years to be improved in fuel-saving performance through further reduction in viscosity while having a high flash point to maintain satisfactory safety.

The lubricant base oil disclosed in PTL 1 is a high viscosity base oil having a kinematic viscosity at 40° C. of 9.0 mm$^2$/s or higher, and thus cannot be considered as a base oil that is suitable for improving fuel-saving performance by reducing the viscosity of a lubricating oil composition.

An object of the present invention is to provide a mineral base oil that can easily produce a lubricating oil composition that has a high flash point while having a further reduced viscosity and thereby having further improved fuel-saving performance; a lubricating oil composition using the mineral base oil; and a method of using a lubricating oil composition.

Solution to Problem

The present inventors have found that the above problem can be solved by a mineral base oil that has a reduced viscosity due to adjusted kinematic viscosities at 40° C. and 100° C. to prescribed ranges and further has a flash point equal to or higher than a prescribed value, completing the present invention. Specifically, the present invention provides the following [1] to [3].

[1] A mineral base oil having:
  a kinematic viscosity at 40° C. of 4.0 mm$^2$/s or more and less than 6.0 mm$^2$/s,
  a kinematic viscosity at 100° C. of 1.0 mm$^2$/s or more and less than 2.0 mm$^2$/s, and
  a flash point of 140° C. or higher.

[2] A lubricating oil composition containing the mineral base oil according to the above [1].

[3] A method of using a lubricating oil composition, including using a lubricating oil composition containing the mineral base oil according to the above [1] for lubrication of any mechanism selected from a transmission system, an engine, a hydraulic actuation device, a turbine, a compressor, a machine tool, a cutting machine, a gear, a fluid bearing, and a rolling bearing.

Advantageous Effects of Invention

The use of the mineral base oil of the present invention enables easy production of a lubricating oil composition that has a high flash point while having a reduced viscosity and thereby having further improved fuel-saving performance in use as a driving system oil and the like.

DESCRIPTION OF EMBODIMENTS

[Nature of Mineral Base Oil of the Present Invention]

The mineral base oil of the present invention satisfies the following Requirements (I) and (II):

Requirement (I): a kinematic viscosity at 40° C. is 4.0 mm$^2$/s or more and less than 6.0 mm$^2$/s, and a kinematic viscosity at 100° C. is 1.0 mm$^2$/s or more and less than 2.0 mm$^2$/s.

Requirement (II): a flash point is 140° C. or higher.

In the Description, the kinematic viscosity at 40° C. or 100° C. means a value measured according to JIS K2283, and the flash point means a value measured by the Cleveland open-cup (COC) method according to JIS K2265-4.

In the general nature of a mineral base oil, a reduced viscosity tends to lead to a lowered flash point.

In contrast, the mineral base oil of the present invention is a mineral base oil that has a reduced viscosity as defined in Requirement (I) while having a high flash point of 140° C. or higher as defined in Requirement (II).

Thus, the use of the mineral base oil of the present invention enables easy production of a lubricating oil composition that has a high flash point while having a reduced viscosity and thereby having further improved fuel-saving performance in use as a driving system oil and the like.

In addition, the mineral base oil of the present invention has a relatively small difference between the kinematic viscosity at 40° C. and the kinematic viscosity at 100° C. as defined in Requirement (I), and thus the viscosity shows low temperature dependence. For this reason, the use of the mineral base oil of the present invention enables production of a lubricating oil composition that shows small viscosity variation by temperature.

The kinematic viscosity at 40° C. ($V_{40}$) of the mineral base oil of the present invention is 4.0 mm$^2$/s or more, but is preferably 4.2 mm$^2$/s or more, more preferably 4.3 mm$^2$/s or more, and further preferably 4.4 mm$^2$/s or more.

The kinematic viscosity ($V_{40}$) is less than 6.0 mm²/s, but is preferably 5.8 mm²/s or less, more preferably 5.7 mm²/s or less, further preferably 5.6 mm²/s or less.

The kinematic viscosity at 100° C. ($V_{100}$) of the mineral base oil of the present invention is 1.0 mm²/s or more, but is preferably 1.2 mm²/s or more, more preferably 1.3 mm²/s or more, further preferably 1.4 mm²/s or more, and furthermore preferably 1.5 mm²/s or more.

The kinematic viscosity ($V_{100}$) is less than 2.0 mm²/s, but is preferably 1.95 mm²/s or less, more preferably 1.90 mm²/s or less, and further preferably 1.85 mm²/s or less.

The mineral base oil of the present invention is a mineral oil whose viscosity index measured according to JIS K2283 cannot be calculated.

The flash point of the mineral base oil of the present invention is 140° C. or higher, but is preferably 142° C. or higher, more preferably 144° C. or higher, further preferably 146° C. or higher, further preferably 150° C. or higher, furthermore preferably 154° C. or higher, and particularly preferably 160° C. or higher, and is generally 180° C. or lower.

In a distillation test in accordance with JIS K2254 of the mineral base oil of one embodiment of the present invention, the 10 volume percent distillation temperature of the mineral base oil is preferably 250° C. or higher, more preferably 255° C. or higher, further preferably 280° C. or higher, and furthermore preferably 285° C. or higher, and is generally 305° C. or lower.

In a distillation test in accordance with JIS K2254 of the mineral base oil of one embodiment of the present invention, the 90 volume percent distillation temperature of the mineral base oil is preferably 320° C. or higher, more preferably 330° C. or higher, further preferably 340° C. or higher, and furthermore preferably 350° C. or higher, and is generally 365° C. or lower.

An aniline point of the mineral base oil of one embodiment of the present invention is preferably 70° C. or higher, more preferably 80° C. or higher, further preferably 85° C. or higher, furthermore preferably 90° C. or higher, and particularly preferably 92° C. or higher, and is generally 110° C. or lower.

A mineral base oil having an aniline point of 70° C. or higher tends to have a high paraffin content and a low aromatic content, likely leading to a high flash point.

The aniline point, as used herein, means a value measured according to JIS K2256 (U-tube method).

A density at 15° C. of the mineral base oil of one embodiment of the present invention is preferably 0.860 g/cm³ or less, more preferably 0.850 g/cm³ or less, further preferably 0.840 g/cm³ or less, furthermore preferably 0.830 g/cm³ or less, and particularly preferably 0.825 g/cm³ or less, and is generally 0.800 g/cm³ or more.

Any mineral base oil that satisfies Requirement (I) and (II) and that also has a density of 0.860 g/cm³ or less can be considered as a mineral base oil having low temperature dependence of viscosity and having a higher flash point.

As used herein, the density at 15° C. means a value measured according to JIS K2249.

A paraffin content (% $C_P$) in the mineral base oil of one embodiment of the present invention is preferably 60 to 80, more preferably 62 to 79, further preferably 66 to 78, and furthermore preferably 68 to 77.

A naphthene content (% $C_P$) in the mineral base oil of one embodiment of the present invention is preferably 10 to 40, more preferably 13 to 38, further preferably 16 to 34, and furthermore preferably 20 to 32.

An aromatic content (% $C_A$) in the mineral base oil of one embodiment of the present invention is preferably less than 2.0, more preferably less than 1.0, and further preferably less than 0.1.

As used herein, the paraffin content (% $C_P$), the naphthene content (% $C_N$), and the aromatic content (% $C_A$) respectively mean proportions (percentages) of a paraffin component, a naphthene component, and an aromatic component measured according to ASTM D-3238 ring analysis (n-d-M method).

The mineral base oil of one embodiment of the present invention preferably further satisfies the following Requirement (III):

Requirement (III): a temperature gradient $\Delta|\eta^*|$ of complex viscosity between two temperature points −10° C. and −25° C. (hereinafter also referred to simply as "temperature gradient $\Delta|\eta^*|$ of complex viscosity") is 0.1 Pa·s/° C. or less as measured with a rotary rheometer under conditions at an angular velocity of 6.3 rad/s and a strain amount of 0.1 to 100%.

In the case where the mineral base oil of one embodiment of the present invention is a mixed oil of two or more mineral oils, it is enough that the mixed oil satisfies the aforementioned Requirement (III).

The "strain amount" described in Requirement (III) is a value that is appropriately set within the range of from 0.1 to 100% according to the temperature.

The aforementioned "temperature gradient $\Delta|\eta^*|$ of complex viscosity" is a value indicative of an amount of change (absolute value of a slope) of complex viscosity per unit between two temperature points −10° C. and −25° C. as observed when the value of the complex viscosity $\eta^*$ at −10° C. and the value of the complex viscosity $\eta^*$ at −25° C. as measured either independently at these temperatures or while continuously varying the temperature from −10° C. to −25° C. or from −25° C. to −10° C. are placed on a temperature-complex viscosity coordinate plane. More specifically, the temperature gradient $\Delta|\eta^*|$ of complex viscosity means a value calculated from the following calculation formula (f1).

Temperature gradient $\Delta|\eta^*|$ of complex viscosity=|([complex viscosity $\eta^*$ at −25° C.]−[complex viscosity $\eta^*$ at −10° C.])/(−25−(−10))|
  Calculation formula (f1):

That is, the "temperature gradient $\Delta|\eta^*|$ of complex viscosity" defined in Requirement (III) represents the temporal change during temperature decrease as the low-temperature characteristics of the mineral oil.

Mineral oil contains a wax component. Thus, when the temperature of a mineral oil is gradually decreased, the wax component in the mineral oil precipitates to form a gel-like structure. Such wax components precipitate at different temperatures depending on the structure of paraffin or the like. The gel-like structure of such a wax component easily breaks, and therefore the viscosity of a mineral oil varies by a mechanical action. Conventionally used parameters of low-temperature viscosity characteristics have been provided without considering such precipitation of wax.

In contrast, the "temperature gradient $\Delta|\eta^*|$ of complex viscosity" defined in Requirement (III) is an index that can accurately evaluate the low-temperature viscosity characteristics of a mineral oil by taking into account the precipitation rate of the wax component contained in the mineral oil to consider the variation in the coefficient of friction involved in the precipitation of the wax component.

The mineral base oil that satisfies Requirement (III) has a temperature gradient $\Delta|\eta^*|$ of complex viscosity of 0.1

Pa·s/° C. or less, and is thus regulated not to have so high precipitation rate of the wax component. Accordingly, since the coefficient of friction is not liable to increase, the mineral oil has lower temperature dependence of viscosity while having a lower viscosity.

Accordingly, the use of the mineral base oil enables production of a lubricating oil composition that is excellent in fuel-saving performance and shows smaller variation in viscosity due to temperature.

From the above viewpoint, the temperature gradient $\Delta|\eta^*|$ of complex viscosity defined in Requirement (III) is preferably 0.08 Pa·s/° C. or less, more preferably 0.05 Pa·s/° C. or less, further preferably 0.02 Pa·s/° C. or less, further preferably 0.01 Pa·s/° C. or less, furthermore preferably 0.005 Pa·s/° C. or less, and particularly preferably 0.0030 Pa·s/° C. or less.

The temperature gradient $\Delta|\eta^*|$ of complex viscosity defined in Requirement (III) has no particular lower limit, but is preferably 0.0001 Pa·s/° C. or more, more preferably 0.0005 Pa·s/° C. or more, further preferably 0.0010 Pa·s/° C. or more, and furthermore preferably 0.0018 Pa·s/° C. or more.

<Example of Preparation of Mineral Base Oil of the Present Invention>

The mineral base oil of the present invention that satisfies Requirements (I) to (III) mentioned above can be easily prepared by appropriately considering selection of a feedstock oil as a raw material of the mineral base oil and matters as described below regarding a method of producing the mineral base oil using the feedstock oil. That is, the mineral base oil of the present invention is preferably a mineral oil that is obtained by subjecting a feedstock oil described below to a refining process described below.

The following matters represent one example of the preparation method and such a mineral base oil can be prepared by taking into account other matters.

[Selection of Feedstock Oil]

A raw material for the mineral base oil of the present invention is referred to as a feedstock oil. Examples of the feedstock oil include a topped crude oil obtained by atmospheric distillation of a crude oil, such as a paraffinic mineral oil, an intermediate mineral oil, or a naphthenic mineral oil; a distillate oil obtained by vacuum distillation of the topped crude oil; and a mineral oil or a wax (e.g., GTL wax) obtained by subjecting the distillate oil to at least one of refining processes, such as solvent deasphalting, solvent extraction, hydrofinishing, solvent dewaxing, catalytic dewaxing, isomerization dewaxing, and vacuum distillation.

These feedstock oils may be used either alone or in combination of two or more thereof.

The feedstock oil preferably contains a gas oil fraction from the viewpoint of preparing a mineral base oil that has a reduced viscosity to the extent defined in Requirement (I) while showing low viscosity dependence on temperature and having a high flash point as defined in Requirement (II), and more preferably contains a gas oil fraction obtained by hydrocracking of a heavy gas oil.

From the above viewpoint, the gas oil fraction preferably has a high paraffin content.

The kinematic viscosity at 40° C. of the feedstock oil is preferably 4.0 to 6.0 mm$^2$/s, more preferably 4.2 to 5.8 mm$^2$/s, and further preferably 4.4 to 5.6 mm$^2$/s.

The kinematic viscosity at 100° C. of the feedstock oil is preferably 1.0 to 2.0 mm$^2$/s, more preferably 1.2 to 1.9 mm$^2$/s, and further preferably 1.4 to 1.85 mm$^2$/s.

The flash point of the feedstock oil is generally 70° C. or higher and lower than 140° C.

The paraffin content (% $C_P$), the aromatic content (% $C_A$), and the naphthene content (% $C_N$) of the feedstock oil are preferably in the ranges described below as measured according to the ASTM D-3238 ring analysis (n-d-M method), from the viewpoint of preparing a mineral base oil that has a reduced viscosity to the extent defined in Requirement (I) while showing low viscosity dependence on temperature.

Paraffin content (% $C_P$): preferably 60 or more, more preferably 65 or more, further preferably 68 or more, and furthermore preferably 70 or more, and preferably 98 or less.

Aromatic content (% $C_A$): preferably 10.0 or less, more preferably 5.0 or less, and further preferably 4.4 or less.

Naphthene content (% $C_N$): preferably 10 to 40, more preferably 11 to 35, further preferably 12 to 32, and furthermore preferably 13 to 32.

The proportion of each of the aroma component, the naphthene component, the n-paraffin component, and the isoparaffin component present in the feedstock oil based on 100% by volume of the total amount of the components is preferably in the range described below as measured according to ASTM D2786 and GC-FID method, from the viewpoint of preparing a mineral base oil that has a reduced viscosity to the extent defined in Requirement (I) while showing low viscosity dependence on temperature.

The "aroma component" collectively means hydrocarbon compounds having an aromatic ring, and the aroma content is preferably 25% by volume or less, more preferably 15% by volume or less, and further preferably 10% by volume or less, and is preferably 1% by volume or more.

The "naphthene component" collectively means saturated cyclic hydrocarbon compounds, and the naphthene content is preferably 70% by volume or less, more preferably 60% by volume or less, and further preferably 50% by volume or less, and is preferably 10% by volume or more.

The "n-paraffin component" collectively means saturated straight-chain hydrocarbon compounds, and the n-paraffin content is preferably 50% by volume or less, more preferably 30% by volume or less, and further preferably 15% by volume or less.

The "isoparaffin component" collectively means saturated branched-chain hydrocarbon compounds, and the isoparaffin content is preferably 8% by volume or more, more preferably 25% by volume or more, and further preferably 30% by volume or more, and is preferably 70% by volume or less.

The 10 volume percent distillation temperature of the feedstock oil is preferably 250° C. or higher, more preferably 260° C. or higher, further preferably 270° C. or higher, and furthermore preferably 275° C. or higher, and generally 290° C. or lower as measured by a distillation test in accordance with JIS K2254.

The 90 volume percent distillation temperature of the feedstock oil is preferably 320° C. or higher, more preferably 350° C. or higher, further preferably 855° C. or higher, furthermore preferably 360° C. or higher, and particularly preferably 366° C. or higher, and is generally 400° C. or lower as measured by the distillation test.

When the 10 volume percent distillation temperature and the 90 volume percent distillation temperature fall within the above ranges, a mineral base oil having a high flash point as defined in Requirement (II) can be prepared.

A mass average molecular weight (Mw) of the feedstock oil is preferably 150 to 450, more preferably 180 to 400, and further preferably 200 to 350.

The mass average molecular weight (Mw) of a feedstock oil, as used herein, means a value measured according to ASTM D2502.

A described above, the kinematic viscosities at 40° C. and 100° C. of the feedstock oil to be used in the present invention do not largely differ from the ranges defined in Requirement (I).

However, the flash point of a feedstock oil having a low viscosity as described above is generally lower than 140° C. and does not satisfy Requirement (II). In addition, the feedstock oil also tends to be increased in the temperature gradient $\Delta|\eta^*|$ of complex viscosity as defined in Requirement (III), and has a problem in terms of the low-temperature viscosity characteristics.

On the other hand, even though such a feedstock oil is used, the mineral base oil of the present invention has a high flash point and has a low viscosity while having a lowered temperature dependence of the viscosity, that is, having an excellent low-temperature viscosity characteristics, by application of a refining process as described below.

[Method of Producing Mineral Base Oil of the Present Invention]

The mineral base oil of one embodiment of the present invention is preferably obtained by subjecting the aforementioned feedstock oil to a refining process. Preferably, the type of the refining process and the refining conditions are appropriately set according to the type of the feedstock oil to be used.

The refining process preferably includes at least a hydrogenation isomerization dewaxing process, and more preferably includes a hydrogenation isomerization dewaxing process and a hydrofinishing process.

That is, the mineral base oil of one embodiment of the present invention is preferably obtained through a hydrogenation isomerization dewaxing process, and more preferably obtained further through a hydrofinishing process after the hydrogenation isomerization dewaxing process.

The "hydrogenation isomerization dewaxing process" and "hydrofinishing process" will be explained below.

(Hydrogenation Isomerization Dewaxing Process)

Hydrogenation isomerization dewaxing process is a refining process performed for the purpose of isomerization of straight-chain paraffins contained in a feedstock oil to branched-chain isoparaffins as mentioned above.

Hydrogenation isomerization dewaxing process can also achieve ring opening of an aromatic component into a paraffin component, removal of impurities, such as a sulfur component and a nitrogen component, and so on.

The hydrogenation isomerization process leads to increase in the proportion of branched-chain isoparaffin, making it possible to prepare a mineral base oil having low viscosity dependence on temperature and having a high flash point.

The presence of straight-chain paraffin in the feedstock oil is one of the factors of increasing the value of the temperature gradient $\Delta|\eta^*|$ of complex viscosity defined in Requirement (III). Thus, in this process, it is preferred that straight-chain paraffins are isomerized to branched-chain isoparaffins to adjust the temperature gradient $\Delta|\eta^*|$ of complex viscosity to a low value.

Besides that, this process can also reduce the pour point of the mineral base oil, and therefore a mineral base oil having further improved low-temperature viscosity characteristics can be obtained.

The hydrogenation isomerization dewaxing process is preferably carried out in the presence of a hydrogenation isomerization dewaxing catalyst.

Examples of hydrogenation isomerization dewaxing catalysts include catalysts with metal oxides, such as oxides of nickel (Ni)/tungsten (W), nickel (Ni)/molybdenum (Mo), and cobalt (Co)/molybdenum (Mo), or noble metals, such as platinum (Pt) and lead (Pd), supported on carriers, such as silicoaluminophosphate (SAPO) and zeolite.

From the viewpoint of producing a mineral base oil satisfying Requirements (III) and (IV), the hydrogen partial pressure in the hydrogenation isomerization dewaxing process is preferably 2.0 to 30 MPa, more preferably 2.5 to 27 MPa, further preferably 3.0 to 25 MPa, and furthermore preferably 3.5 to 22 MPa.

From the viewpoint of producing a mineral base oil satisfying Requirements (II) and (III), the reaction temperature in the hydrogenation isomerization dewaxing process is preferably set to a temperature higher than the reaction temperature of a common hydrogenation isomerization dewaxing process, and specifically is preferably 250 to 400° C., more preferably 275 to 380° C., further preferably 280 to 370° C., and furthermore preferably 285 to 360° C.

When the reaction temperature is high, the isomerization of straight-chain paraffins into branched-chain isoparaffins can be promoted, whereby it becomes easy to prepare a mineral base oil satisfying Requirements (II) and (III).

From the viewpoint of producing a mineral base oil satisfying Requirements (III) and (IV), the liquid hourly space velocity (LHSV) in the hydrogenation isomerization dewaxing process is preferably 5.0 hr$^{-1}$ or less, more preferably 3.0 hr$^{-1}$ or less, further preferably 2.0 hr$^{-1}$ or less, and furthermore preferably 1.5 hr$^{-1}$ or less.

From the viewpoint of improving the productivity, the LHSV in the hydrogenation isomerization dewaxing process is preferably 0.1 hr$^{-1}$ or more, and more preferably 0.2 hr$^{-1}$ or more.

The supply proportion of the hydrogen gas in the hydrogenation isomerization dewaxing process is preferably 100 to 2000 Nm$^3$, more preferably 200 to 1500 Nm$^3$, and further preferably 250 to 1000 Nm$^3$ per kiloliter of the supplied feedstock oil.

(Hydrofinishing Process)

The hydrofinishing process is a refining process that is performed for purposes of complete saturation of the aromatic component contained in the feedstock oil, removal of impurities, such as a sulfur component and a nitrogen component, and so on.

The hydrofinishing process is preferably carried out in the presence of a hydrogenation catalyst.

Examples of hydrogenation catalysts include catalysts with metal oxides, such as oxides of nickel (Ni)/tungsten (W), nickel (Ni)/molybdenum (Mo), and cobalt (Co)/molybdenum (Mo), or noble metals, such as platinum (Pt) and lead (Pd), supported on amorphous carriers, such as silica/alumina and alumina, or crystalline carriers, such as zeolite.

From the viewpoint of producing a mineral base oil satisfying Requirements (III), the hydrogen partial pressure in the hydrofinishing process is preferably set to a value higher than a pressure of a common hydrogenation process, and specifically is preferably 16 MPa or more, more preferably 17 MPa or more, and further preferably 18 MPa or more, and is preferably 30 MPa or less, and more preferably 22 MPa or less.

From the viewpoint of producing a mineral base oil satisfying Requirements (III), the reaction temperature in the hydrofinishing process is preferably 200 to 400° C., more preferably 250 to 350° C., and further preferably 280 to 330° C.

From the viewpoint of producing a mineral base oil satisfying Requirements (III), the liquid hourly space velocity (LHSV) in the hydrofinishing process is preferably 5.0 $hr^{-1}$ or less, more preferably 2.0 $hr^{-1}$ or less, and further preferably 1.0 $hr^{-1}$ or less, and from the viewpoint of productivity, it is preferably 0.1 $hr^{-1}$ or more, more preferably 0.2 $hr^{-1}$ or more, and further preferably 0.3 $hr^{-1}$ or more.

The supply proportion of the hydrogen gas in the hydrofinishing process is preferably 100 to 2,000 $Nm^3$, more preferably 200 to 1,500 $Nm^3$, and further preferably 250 to 1,100 $Nm^3$ per kiloliter of the supplied oil (the refined oil after the hydrogenation isomerization dewaxing process)

(Post-Treatment)

After the completion of the aforementioned refining process, the resulting refined oil is subjected to vacuum distillation to collect a fraction having a kinematic viscosity at 40° C. in the range defined in Requirement (I), whereby the mineral base oil of the present invention can be obtained.

The mineral base oil obtained here has a high flash point while having a lowered viscosity as defined in Requirement (I).

The conditions (pressure, temperature, time, etc.) for the vacuum distillation are appropriately adjusted so that the resulting mineral base oil has kinematic viscosities at 40° C. and 100° C. in the ranges defined in Requirement (I).

[Lubricating Oil Composition]

The lubricating oil composition of the present invention contains the aforementioned mineral base oil of the present invention. The lubricating oil composition may contain a synthetic oil together with the mineral base oil.

Examples of synthetic oils include poly-α-olefins, such as α-olefin homopolymers and α-olefin copolymers (for example, an α-olefin copolymer having 8 to 14 carbon atoms, such as an ethylene-α-olefin copolymer); isoparaffins; various esters, such as polyol esters, dibasic acid esters (for example, ditridecyl glutarate), tribasic acid esters (for example, 2-ethylhexyl trimellitate), and phosphoric esters; various ethers, such as polyphenyl ethers; polyalkylene glycols; alkylbenzenes; alkylnaphthalenes; and synthetic oils obtained by isomerizing waxes (GTL waxes) produced by the Fischer-Tropsch process.

The synthetic oils may be used either alone or in combination of two or more thereof.

In the lubricating oil composition in one embodiment of the present invention, the content of the synthetic oil is preferably 0 to 30 parts by mass, more preferably 0 to 20 parts by mass, further preferably 0 to 10 parts by mass, and furthermore preferably 0 to 5 parts by mass based on 100 parts by mass of the whole amount of the mineral base oil of the present invention contained in the lubricating oil composition.

The content of the mineral base oil of the present invention in the lubricating oil composition of one embodiment of the present invention is generally 60% by mass or more, preferably 70% by mass or more, more preferably 80% by mass or more, further preferably 85% by mass or more, and furthermore preferably 90% by mass or more, and is generally 100% by mass or less, more preferably 99.99% by mass or less, and further preferably 99% by mass or less based on the whole amount (100% by mass) of the lubricating oil composition.

The lubricating oil composition of the present invention may further contain a commonly-used additive for lubricating oil, as needed, to the extent that does not impair the effect of the present invention.

Examples of such additives for lubricating oil include a pour point depressant, a viscosity index improver, a metal-based detergent, a dispersant, an anti-wear agent, an extreme pressure agent, an antioxidant, an anti-foaming agent, a friction modifier, a rust inhibitor, and a metal deactivator.

As the additive for lubricating oil, a commercially available additive package containing plural additives may be used.

Also, a compound having multiple functions as the aforementioned additives (for example a compound having functions as an anti-wear agent and an extreme pressure agent) may be used.

The additives for a lubricating oil may be used either alone or in combination of two or more thereof.

The content of each of the additives for lubricating oil can be appropriately adjusted according to the type of the additive to the extent that does not impair the effect of the present invention, and is generally 0.001 to 15% by mass, preferably 0.005 to 10% by mass, and more preferably 0.01 to 8% by mass based on the whole amount (100% by mass) of the lubricating oil composition.

<Use of Lubricating Oil Composition>

Because of containing the aforementioned mineral base oil of the present invention, the lubricating oil composition of the present invention has a high flash point and is excellent in the fuel-saving performance.

Thus, the lubricating oil composition of the present invention can be suitably used as a driving system oil, such as an automatic transmission fluid (ATF), a continuously variable transmission fluid (CVTF), a shock absorber fluid (SAF), a power steering oil, or an electric motor oil; and engine oil; a hydraulic fluid; a turbine oil; a compressor oil; a machine tool lubricating oil; a cutting machine oil; a gear oil; a fluid bearing oil; a rolling bearing oil; and the like.

In recent years, particularly in electric vehicles and hybrid vehicles, size and weight reduction has been required by packaging a transmission and an electric motor. Thus, there has been a need for a lubricating oil composition having, in addition to the performance required for a transmission oil, the cooling property required for an electric motor oil. The lubricating oil composition of the present invention has a certain cooling performance due to its low viscosity, and therefore is suitable for the use in such electric vehicles and hybrid vehicles.

The lubricating oil composition of the present invention can also be used as a refrigerator oil, a rolling oil, an insulating oil, and an elastomer softening agent.

In other words, the present invention can provide a method of using a lubricating oil composition described in the following (1) and (2).

(1) A method of using a lubricating oil composition, wherein a lubricating oil composition containing the mineral base oil of the present invention is used for lubrication of any mechanism selected from a transmission system (an automatic transmission, a continuously variable transmission, a shock absorber, a power steering, an electric motor, etc.), an engine, a hydraulic actuation device, a turbine, a compressor, a machine tool, a cutting machine, a gear, a fluid bearing, and a rolling bearing.

(2) A method of using a lubricating oil composition, wherein a lubricating oil composition containing the mineral base oil of the present invention is used in a refrigerator, a rolling machine, or an electric device (a transmission, a cable, a capacitor, etc.).

EXAMPLES

Next, the present invention will be described in more detail below with reference to examples, but the present invention is by no means limited to the examples. The methods of measurement and evaluation of physical properties are as follows.

(1) Kinematic Viscosity at 40° C. and 100° C.

It was measured according to JIS K2283.

(2) Flash Point

It was measured by the Cleveland open-cup (COC) method in accordance with JIS K2265-4.

(3) Aromatic Content (% $C_A$), Naphthene Content (% $C_N$), and Paraffin Content (% $C_P$)

They were measured according to ASTM D-3238 ring analysis (n-d-M method).

(4) Density at 15° C.

It was measured according to JIS K2249.

(5) Refractive Index at 20° C.

It was measured according to JIS K0062.

(6) 10 Volume Percent Distillation Temperature and 90 Volume Percent Distillation Temperature They were measured according to JIS K2254.

(7) Aniline Point

It was measured according to JIS K2256 (U-tube method).

(8) Mass Average Molecular Weight (Mw)

It was measured according to ASTM D2502.

(9) Temperature Gradient $\Delta|\eta^*|$ of Complex Viscosity Between Two Temperature Points of −25° C. and −10° C.

It was measured using a rheometer "Physica MCR 301" manufactured by Anton Paar according to the following procedure.

First, a mineral base oil to be measured was inserted in a corn plate (diameter: 50 mm, angle of inclination: 1°) adjusted to a measurement temperature of −25° C. or −10° C., and then kept at the same temperature for 10 minutes. During the time, care was taken not to give a strain to the inserted solution.

Then, at the measurement temperature of −25° C. or −10° C., the complex viscosity $\eta^*$ at −25° C. or −10° C. was measured in a vibration mode under conditions at an angular velocity of 6.3 rad/s and a strain amount appropriately set in the range of 0.1 to 100% according to the measurement temperature.

Then, "temperature gradient $\Delta|\eta^*|$ of complex viscosity" was calculated from the value of the complex viscosity $\eta^*$ at −25° C. or −10° C. using the aforementioned calculation formula (f1).

(10) Proportions of Aroma Component, Naphthene Component, n-Paraffin Component, and Isoparaffin Component The aroma content, the naphthene content, and the total paraffin content (n-paraffin content+isoparaffin content) were determined according to ASTM D2786. Next, the n-paraffin content was determined according to a GC-FID method, and the isoparaffin content was determined from the difference between the total paraffin content and the n-paraffin content.

Then, the proportion of each of the aroma component, the naphthene component, the n-paraffin component, and the isoparaffin component based on the 100% by volume of the total amount of the components was calculated.

Table 1 shows various properties of feedstock oils (I) to (IV) used in Examples and Comparative Examples.

The feedstock oils (I) and (II) are oils containing a gas oil fraction obtained through hydrocracking of a heavy gas oil with a hydrocracking apparatus.

The feedstock oil (III) is an oil containing a gas oil fraction obtained through hydrocracking of a vacuum heavy oil with a hydrocracking apparatus.

The feedstock oil (IV) is an oil containing a gas oil fraction obtained through deep desulfurization of a straight-run stock gas oil fraction.

TABLE 1

| Gas oil fraction contained | | Feedstock oil (I) Gas oil fraction obtained by hydrocracking heavy gas oil | Feedstock oil (II) Gas oil fraction obtained by hydrocracking heavy gas oil | Feedstock oil (III) Gas oil fraction obtained by hydrocracking vacuum heavy oil | Feedstock oil (IV) Gas oil fraction obtained by deep desulfurization of straight-run gas oil fraction |
|---|---|---|---|---|---|
| Kinetic viscosity at 40° C. | mm$^2$/s | 4.869 | 5.170 | 5.025 | 3.599 |
| Kinetic viscosity at 100° C. | mm$^2$/s | 1.693 | 1.754 | 1.666 | 1.387 |
| Flash point | ° C. | 100 | 124 | 138 | 76 |
| Aromatic content (% $C_A$) | — | — | 4.1 | 4.4 | 12.9 | 14.2 |
| Naphthene content (% $C_N$) | — | 21.6 | 25.9 | 39.6 | 25.9 |
| Paraffin content (% $C_P$) | — | 74.3 | 69.7 | 47.5 | 59.9 |
| Density (15° C.) | g/cm$^3$ | 0.8187 | 0.8265 | 0.8689 | 0.8370 |
| Refractive index (20° C.) | — | 1.4539 | 1.4574 | 1.4789 | 1.4657 |
| 10 vol. % distillation temperature | ° C. | 278 | 278 | 271 | 234 |
| 90 vol. % distillation temperature | ° C. | 366 | 383 | 343 | 366 |
| Mass average molecular weight (Mw) | — | 232 | 238 | 265 | 200 |
| Aroma content | vol. % | 8.5 | 8.4 | 17.1 | 23.2 |
| Naphthene content | vol. % | 41.5 | 46.8 | 69.5 | 39.1 |
| n-Paraffin content | vol. % | 8.7 | 8.8 | 3.7 | 16.4 |
| Isoparaffin content | vol. % | 41.3 | 36.0 | 9.7 | 21.3 |

Example 1 (Production of Mineral Base Oil (1))

The feedstock oil (I) shown in Table 1 was subjected to a hydrogenation isomerization dewaxing process using a platinum/zeolite catalyst (a catalyst with platinum supported on zeolite as a carrier) under conditions at a reaction temperature of 290° C., a hydrogen partial pressure of 4 MPa, and a ratio of the supply amount of hydrogen to that of the feed stock oil (I) [hydrogen/feedstock oil (I)] of 422 Nm$^3$/kL, and LHSV of 1.1 hr$^{-1}$, thereby obtaining a refined oil (i).

Then, the refined oil (i) was subjected to vacuum distillation to collect a fraction having a kinematic viscosity at 40° C. in the range of 4.0 to 6.0 mm$^2$/s, thereby obtaining a mineral base oil (1).

Example 2 (Production of Mineral Base Oil (2))

The feedstock oil (II) shown in Table 1 was subjected to a hydrogenation isomerization dewaxing process using a platinum/zeolite catalyst (a catalyst with platinum supported on zeolite as a carrier) under conditions at a reaction temperature of 292° C., a hydrogen partial pressure of 4 MPa, a ratio of the supply amount of hydrogen to that of the feed stock oil (II) [hydrogen/feedstock oil (II)] of 422 Nm$^3$/kL, and LHSV of 1.1 hr$^{-1}$, thereby obtaining a refined oil (ii).

Then, the refined oil (ii) was subjected to vacuum distillation to collect a fraction having a kinematic viscosity at 40° C. in the range of 4.0 to 6.0 mm$^2$/s, thereby obtaining a mineral base oil (2).

Example 3 (Production of Mineral Base Oil (3))

The feedstock oil (I) shown in Table 1 was subjected to a hydrogenation isomerization dewaxing process using a platinum/zeolite catalyst (a catalyst with platinum supported on zeolite as a carrier) under conditions at a reaction temperature of 287° C., a hydrogen partial pressure of 4 MPa, a ratio of the supply amount of hydrogen to that of the feed stock oil (I) [hydrogen/feedstock oil (I)] of 422 Nm$^3$/kL, and LHSV of 1.1 hr$^{-1}$, thereby obtaining a refined oil (iii).

Then, the refined oil (iii) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 18.5 MPa, a ratio of the supply amount of hydrogen to that of the feed stock oil (iii) [hydrogen/refined oil (iii)] of 1000 Nm$^3$/kL, and LHSV of 0.6 hr$^{-1}$, thereby obtaining a refined oil (iii-1).

Then, the refined oil (iii-1) was subjected to vacuum distillation to collect a fraction having a kinematic viscosity at 40° C. in the range of 4.0 mm$^2$/s or more and less than 5.0 mm$^2$/s, thereby obtaining a mineral base oil (3).

Example 4 (Production of Mineral Base Oil (4))

The feedstock oil (II) shown in Table 1 was subjected to a hydrogenation isomerization dewaxing process using a platinum/zeolite catalyst (a catalyst with platinum supported on zeolite as a carrier) under conditions at a reaction temperature of 294° C., a hydrogen partial pressure of 4 MPa, a ratio of the supply amount of hydrogen to that of the feed stock oil (II) [hydrogen/feedstock oil (II)] of 422 Nm$^3$/kL, and LHSV of 1.1 hr$^{-1}$, thereby obtaining a refined oil (iv).

Then, the refined oil (iv) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 18.5 MPa, a ratio of the supply amount of hydrogen to that of the feed stock oil (iv) [hydrogen/refined oil (iv)] of 1000 Nm$^3$/kL, and LHSV of 0.6 hr$^{-1}$, thereby obtaining a refined oil (iv-1).

Then, the refined oil (iv-1) was subjected to vacuum distillation to collect a fraction having a kinematic viscosity at 40° C. in the range of 5.0 mm$^2$/s or more and 6.0 mm$^2$/s or less, thereby obtaining a mineral base oil (4).

Example 5 (Production of Mineral Base Oil (5))

The feedstock oil (III) shown in Table 1 was subjected to a hydrogenation isomerization dewaxing process using a platinum/zeolite catalyst (a catalyst with platinum supported on zeolite as a carrier) under conditions at a reaction temperature of 285° C., a hydrogen partial pressure of 4 MPa, a ratio of the supply amount of hydrogen to that of the feed stock oil (III) [hydrogen/feedstock oil (III)] of 422 Nm$^3$/kL, and LHSV of 1.1 hr$^{-1}$, thereby obtaining a refined oil (v).

Then, the refined oil (v) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 18.5 MPa, a ratio of the supply amount of hydrogen to that of the feed stock oil (v) [hydrogen/refined oil (v)] of 1000 Nm$^3$/kL, and LHSV of 0.6 hr$^{-1}$, thereby obtaining a refined oil (v-1).

Then, the refined oil (v-1) was subjected to vacuum distillation to collect a fraction having a kinematic viscosity at 40° C. in the range of 4.0 to 6.0 mm$^2$/s, thereby obtaining a mineral base oil (5).

Example 6 (Production of Mineral Base Oil (6))

The feedstock oil (IV) shown in Table 1 was subjected to a hydrogenation isomerization dewaxing process using a platinum/zeolite catalyst (a catalyst with platinum supported on zeolite as a carrier) under conditions at a reaction temperature of 293° C., a hydrogen partial pressure of 4 MPa, a ratio of the supply amount of hydrogen to that of the feed stock oil (IV) [hydrogen/feedstock oil (IV)] of 422 Nm$^3$/kL, and LHSV of 1.1 hr$^{-1}$, thereby obtaining a refined oil (vi).

Then, the refined oil (vi) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 18.5 MPa, a ratio of the supply amount of hydrogen to that of the feed stock oil (vi) [hydrogen/refined oil (vi)] of 1000 Nm$^3$/kL, and LHSV of 0.6 hr$^{-1}$, thereby obtaining a refined oil (vi-1).

Then, the refined oil (vi-1) was subjected to vacuum distillation to collect a fraction having a kinematic viscosity at 40° C. in the range of 4.0 to 6.0 mm$^2$/s, thereby obtaining a mineral base oil (6).

Example 7 (Production of Mineral Base Oil (7))

The feedstock oil (I) shown in Table 1 was subjected to a hydrogenation isomerization dewaxing process using a platinum/zeolite catalyst (a catalyst with platinum supported on zeolite as a carrier) under conditions at a reaction temperature of 289 to 292° C., a hydrogen partial pressure of 20.6 MPa, a ratio of the supply amount of hydrogen to that of the feed stock oil (I) [hydrogen/feedstock oil (I)] of 1000 Nm$^3$/kL, and LHSV of 0.65 hr$^{-1}$, thereby obtaining a refined oil (vii).

Then, the refined oil (vii) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 20.6 MPa, a ratio of the supply amount of hydrogen to that of the feed stock oil (vii) [hydrogen/refined oil (vii)] of 1000 Nm$^3$/kL, and LHSV of 0.65 hr$^{-1}$, thereby obtaining a refined oil (vii-1).

Then, the refined oil (vii-1) was subjected to vacuum distillation to collect a fraction having a kinematic viscosity at 40° C. in the range of 4.0 to 6.0 mm$^2$/s, thereby obtaining a mineral base oil (7).

Example 8 (Production of Mineral Base Oil (8))

The feedstock oil (II) shown in Table 1 was subjected to a hydrogenation isomerization dewaxing process using a platinum/zeolite catalyst (a catalyst with platinum supported on zeolite as a carrier) under conditions at a reaction temperature of 294° C., a hydrogen partial pressure of 20.6 MPa, a ratio of the supply amount of hydrogen to that of the feed stock oil (II) [hydrogen/feedstock oil (II)] of 1000 Nm$^3$/kL, and LHSV of 0.65 hr$^{-1}$, thereby obtaining a refined oil (viii).

Then, the refined oil (viii) was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 20.6 MPa, a ratio of the supply amount of hydrogen to that of the feed stock oil (viii) [hydrogen/refined oil (viii)] of 1000 Nm$^3$/kL, and LHSV of 0.66 hr$^{-1}$, thereby obtaining a refined oil (viii-1).

Then, the refined oil (viii-1) was subjected to vacuum distillation to collect a fraction having a kinematic viscosity at 40° C. in the range of 4.0 to 6.0 mm$^2$/s, thereby obtaining a mineral base oil (8).

Example 9 (Production of Mineral Base Oil (9))

The feedstock oil (I) shown in Table 1 was subjected to a hydrogenation isomerization dewaxing process and a hydrofinishing process in the same conditions as in Example 3, and the resulting refined oil (iii-1) was subjected to vacuum distillation to collect a fraction having a kinematic viscosity at 40° C. in the range of 5.0 mm$^2$/s or more and 6.0 mm$^2$/s or less, thereby obtaining a mineral base oil (9).

Example 10 (Production of Mineral Base Oil (10))

The feedstock oil (II) shown in Table 1 was subjected to a hydrogenation isomerization dewaxing process and a hydrofinishing process in the same conditions as in Example 4, and the resulting refined oil (iv-1) was subjected to vacuum distillation to collect a fraction having a kinematic viscosity at 40° C. in the range of 4.0 mm$^2$/s or more and 5.0 mm$^2$/s or less, thereby obtaining a mineral base oil (10).

Example 11 (Production of Mineral Base Oil (11))

The feedstock oil (III) shown in Table 1 was subjected to a hydrofinishing process using a nickel-tungsten/alumina catalyst (a catalyst with nickel and tungsten supported on alumina as a carrier) under conditions at a reaction temperature of 290° C., a hydrogen partial pressure of 20.6 MPa, a ratio of the supply amount of hydrogen to that of the feed stock oil (III) [hydrogen/feedstock oil (III)] of 1000 Nm$^3$/kL, and LHSV of 0.6 hr$^{-1}$, thereby obtaining a refined oil (iii-2).

Then, the refined oil (iii-2) was subjected to vacuum distillation to collect a fraction having a kinematic viscosity at 40° C. in the range of 4.0 to 6.0 mm$^2$/s, thereby obtaining a mineral base oil (11).

Comparative Examples 1 to 2

In Comparative Example 1, the feedstock oil (III) shown in Table 1 was used as it was as a mineral base oil (a) to measure the aforementioned properties.

In Comparative Example 2, the feedstock oil (IV) shown in Table 1 was used as it was as a mineral base oil (b) to measure the aforementioned properties.

The properties of the mineral base oils (1) to (12) and (a) to (b) are shown in Table 2 and Table 3.

TABLE 2

| | | Example 1 | Example 2 | Example 3 | Example 4 | Example 5 | Example 6 | Comparative Example 1 | Comparative Example 2 |
|---|---|---|---|---|---|---|---|---|---|
| Type of mineral base oil | | (1) | (2) | (3) | (4) | (5) | (6) | (a) | (b) |
| Type of feedstock oil used | | Feedstock oil (I) | Feedstock oil (II) | Feedstock oil (I) | Feedstock oil (II) | Feedstock oil (III) | Feedstock oil (IV) | Feedstock oil (III) | Feedstock oil (IV) |
| Application of hydrogenation isomerization dewaxing process | | Yes | Yes | Yes | Yes | Yes | Yes | No | No |
| Application of hydrofinishing process | | No | No | Yes | Yes | Yes | Yes | No | No |
| Kinetic viscosity at 40° C. | mm$^2$/s | 5.483 | 4.567 | 4.840 | 5.409 | 5.046 | 4.787 | 5.025 | 3.599 |
| Kinetic viscosity at 100° C. | mm$^2$/s | 1.817 | 1.567 | 1.670 | 1.793 | 1.722 | 1.595 | 1.666 | 1.387 |
| Flash point | ° C. | 164 | 156 | 150 | 156 | 145 | 140 | 138 | 76 |
| Temperature gradient Δ \|η*\| of complex viscosity between two points of −10° C. and −25° C. | Pa · s/° C. | 0.0019 | 0.0021 | 0.0016 | 0.0022 | 0.0031 | 0.0032 | 0.0039 | — |
| Aniline point | ° C. | 97.0 | 92.1 | 94.8 | 95.6 | 68.2 | 70.0 | 67.6 | 62.0 |
| Density (15° C.) | g/cm$^3$ | 0.8174 | 0.8204 | 0.8170 | 0.8207 | 0.8650 | 0.8350 | 0.8689 | 0.8370 |
| Aromatic content (% C$_A$) | — | 1.1 | 1.6 | 0.5 | 1.0 | 5.0 | 5.8 | 12.9 | 14.2 |
| Naphthene content (% C$_N$) | — | 23.7 | 30.4 | 27.3 | 29.7 | 45.1 | 33.2 | 39.6 | 25.9 |
| Paraffin content (% C$_P$) | — | 75.2 | 68.0 | 72.2 | 69.3 | 49.9 | 61.0 | 47.5 | 59.9 |
| 10 vol. % distillation temperature | ° C. | 296.3 | 292.8 | 290.0 | 289.0 | 255.3 | 250.0 | 271.0 | 234.0 |
| 90 vol. % distillation temperature | ° C. | 360.5 | 332.8 | 342.0 | 358.0 | 333.7 | 356.4 | 343.0 | 366.0 |

TABLE 3

|  | | Example 7 | Example 8 | Example 9 | Example 10 | Example 11 |
|---|---|---|---|---|---|---|
| Type of mineral base oil | | (7) | (8) | (9) | (10) | (11) |
| Type of feedstock oil used | | Feedstock oil (I) | Feedstock oil (II) | Feedstock oil (I) | Feedstock oil (II) | Feedstock oil (III) |
| Application of hydrogenation isomerization dewaxing process | | Yes | Yes | Yes | Yes | No |
| Application of hydrofinishing process | | Yes | Yes | Yes | Yes | Yes |
| Kinetic viscosity at 40° C. | mm$^2$/s | 5.381 | 5.408 | 5.511 | 4.840 | 4.523 |
| Kinetic viscosity at 100° C. | mm$^2$/s | 1.782 | 1.792 | 1.824 | 1.660 | 1.565 |
| Flash point | ° C. | 160 | 164 | 166 | 144 | 141 |
| Temperature gradient Δ |η*| of complex viscosity between two points of −10° C. and −25° C. | Pa · s/° C. | 0.00205 | 0.00220 | 0.00240 | 0.00135 | 0.00155 |
| Aniline point | ° C. | 96.2 | 97.1 | 97.4 | 93.7 | 79.9 |
| Density (15° C.) | g/cm$^3$ | 0.8199 | 0.8189 | 0.8171 | 0.8202 | 0.8549 |
| Aromatic content (% $C_A$) | — | 1.3 | 1.2 | 1.0 | 1.5 | 1.1 |
| Naphthene content (% $C_N$) | — | 26.3 | 25.4 | 26.0 | 31.5 | 54.3 |
| Paraffin content (% $C_P$) | — | 72.4 | 73.4 | 73.0 | 67.0 | 45.5 |
| 10 vol. % distillation temperature | ° C. | 292.0 | 293.0 | 296.0 | 286.0 | 256.8 |
| 90 vol. % distillation temperature | ° C. | 351.0 | 352.0 | 359.0 | 342.0 | 334.4 |

In the results, the mineral base oils (1) to (11) produced in Examples 1 to 11 had a low viscosity while having a high flash point of 140° C. or higher. Accordingly, it is considered that lubricating oil compositions using the mineral base oils would have a high flash point while having a further reduced viscosity and thereby having further improved fuel-saving performance.

On the other hand, the results show that the mineral base oils (a) to (b) in Comparative Examples 1 to 2 had a low viscosity but had a low flash point of less than 140° C., thus having a problem in terms of safety.

The invention claimed is:

1. A mineral base oil having:
   a kinematic viscosity at 40° C. of 4.0 mm$^2$/s or more and less than 6.0 mm$^2$/s;
   a kinematic viscosity at 100° C. of 1.0 mm$^2$/s or more and less than 2.0 mm$^2$/s;
   a temperature gradient Δ|η*| of complex viscosity between two temperature points −10° C. and −25° C. of 0.0032 Pa·s/° C. or less as measured with a rotary rheometer under conditions at an angular velocity of 6.3 rad/s and a strain amount of 0.1 to 100%; and
   a flash point of 140° C. or higher.

2. The mineral base oil according to claim 1, wherein the temperature gradient Δ|η*| of complex viscosity is 0.003 Pa·s/° C. or less.

3. The mineral base oil according to claim 1, wherein the kinematic viscosity at 100° C. is 1.5 mm$^2$/s or more and less than 2.0 mm$^2$/s.

4. The mineral base oil according to claim 1, wherein the mineral base oil is obtained from a feedstock oil, and
   wherein the feedstock oil comprises an aroma component, a naphthene component, an n-paraffin component, and an isoparaffin component, wherein the feedstock oil has a proportion of the n-paraffin component of 50% by volume or less based on 100% by volume of the total amount of the aroma component, the naphthene component, the n-paraffin component, and the isoparaffin component.

5. The mineral base oil according to claim 1, wherein the mineral base oil is obtained from a feedstock oil, and
   wherein the feedstock oil has a 10 volume percent distillation temperature of 250° C. or higher and a 90 volume percent distillation temperature of 320° C. or higher in a distillation test in accordance with JIS K2254.

6. The mineral base oil according to claim 1, wherein the mineral base oil is obtained from a feedstock oil, and
   wherein the feedstock oil has a kinematic viscosity at 40° C. of 4.0 to 6.0 mm$^2$/s and a kinematic viscosity at 100° C. of 1.0 to 2.0 mm$^2$/s.

7. The mineral base oil according to claim 1, wherein the mineral base oil is obtained by a process comprising:
   subjecting a feedstock oil to a hydrogenation isomerization dewaxing process.

8. The mineral base oil according to claim 1, wherein the mineral base oil is obtained by a process comprising:
   subjecting a feedstock oil to a hydrogenation isomerization dewaxing process, to obtain an initial mineral base oil; and then
   subjecting the initial mineral base oil obtained to a hydrofinishing process.

9. The mineral base oil according to claim 1, wherein mineral base oil is obtained from a feedstock oil that comprises a gas oil fraction obtained by hydrocracking of a heavy gas oil.

10. The mineral base oil according to claim 1, wherein the mineral base oil is obtained from a feedstock oil, and
    wherein the feedstock oil has paraffin content (% $C_P$) of 60 or more.

11. The mineral base oil according to claim 1, wherein the mineral base oil is obtained from a feedstock oil, and
    wherein the feedstock oil has an aromatic content (% $C_A$) of 10.0 or less.

12. A lubricating oil composition, comprising the mineral base oil according to claim 1.

13. The lubricating oil composition according to claim 12, which is adapted to function as lubricating oil selected from the group consisting of a driving system oil, an engine oil, a hydraulic fluid, a turbine oil, a compressor oil, a machine tool lubricating oil, a cutting machine oil, a gear oil, a fluid bearing oil, and a rolling bearing oil.

14. A method, comprising:
    lubricating a mechanism with a lubricating oil composition comprising the mineral base oil according to claim 1,
    wherein the mechanism is selected from the group consisting of a transmission system, an engine, a hydraulic actuation device, a turbine, a compressor, a machine tool, a cutting machine, a gear, a fluid bearing, and a rolling bearing.

15. The mineral base oil according to claim 1, wherein a viscosity index of the mineral base oil measured according to JIS K2283 cannot be calculated.

16. A mineral base oil having:
- a kinematic viscosity at 40° C. of 4.0 mm$^2$/s or more and less than 6.0 mm$^2$/s;
- a kinematic viscosity at 100° C. of 1.0 mm$^2$/s or more and less than 2.0 mm$^2$/s;
- a flash point of 140° C. or higher; and
- a paraffin content (% $C_P$) from 60 to 78.

* * * * *

UNITED STATES PATENT AND TRADEMARK OFFICE
CERTIFICATE OF CORRECTION

PATENT NO. : 10,647,937 B2  
APPLICATION NO. : 16/078415  
DATED : May 12, 2020  
INVENTOR(S) : Norihiro Kuroda et al.

Page 1 of 1

It is certified that error appears in the above-identified patent and that said Letters Patent is hereby corrected as shown below:

On the Title Page

Item (71), the Applicant's name is incorrect. Item (71) should read:  
-- (71) Applicant: IDEMITSU KOSAN CO., LTD., Chiyoda-ku (JP) --

Item (73), the Assignee's name is incorrect. Item (73) should read:  
-- (73) Assignee: IDEMITSU KOSAN CO., LTD., Chiyoda-ku (JP) --

Signed and Sealed this  
Tenth Day of November, 2020

Andrei Iancu  
*Director of the United States Patent and Trademark Office*